United States Patent
Beelitz et al.

(10) Patent No.: US 6,247,126 B1
(45) Date of Patent: Jun. 12, 2001

(54) RECOVERABLE SOFTWARE INSTALLATION PROCESS AND APPARATUS FOR A COMPUTER SYSTEM

(75) Inventors: Alan E. Beelitz; Richard D. Amberg, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/236,862

(22) Filed: Jan. 25, 1999

(51) Int. Cl.[7] ............................. G06F 9/24; G06F 15/177
(52) U.S. Cl. ........................................................ 713/1; 713/2
(58) Field of Search ........................... 713/1, 2; 711/170, 711/173

(56) References Cited

U.S. PATENT DOCUMENTS

| | | | |
|---|---|---|---|
| 5,257,378 | * 10/1993 | Sideserf et al. | 713/2 |
| 5,444,861 | 8/1995 | Adamec et al. | |
| 5,715,456 | 2/1998 | Bennett et al. | |
| 5,944,820 | * 8/1999 | Beelitz | 713/1 |
| 6,029,237 | * 2/2000 | Beelitz | 711/173 |
| 6,032,223 | * 2/2000 | Beelitz | 711/104 |
| 6,032,239 | * 2/2000 | Beelitz | 711/173 |
| 6,041,395 | * 3/2000 | Beelitz | 711/173 |
| 6,092,189 | * 7/2000 | Fisher et al. | 713/1 |

* cited by examiner

*Primary Examiner*—Dennis M. Butler
(74) *Attorney, Agent, or Firm*—Haynes and Boone, L.L.P.

(57) ABSTRACT

A software installation process for use in the manufacture of a prescribed computer system includes the steps of providing at least one processor, at least one memory, and an interface for connecting the computer system to a network server. The at least one memory includes a master boot record, a utility partition and a primary partition. The utility partition includes manufacturing code particular to a manufacturing sequence in the manufacture of the computer system. The primary partition further includes file allocation tables and a root directory. Upon booting of the computer system, the manufacturing code is executed by the at least one processor, wherein the manufacturing sequence includes at least a downloading of software from the network server to the primary partition. The manufacturing code further includes instructions for clearing the file allocation tables and the root directory of the primary partition upon the occurrence of an interruption in the downloading of software from the network server and instructions for enabling the software download to be restarted without reformatting and repartitioning of the at least one memory.

30 Claims, 3 Drawing Sheets

RECOVERABLE SOFTWARE INSTALLATION PROCESS AND APPARATUS FOR A COMPUTER SYSTEM

BACKGROUND

The present invention relates generally to building computer systems and more particularly to the preparation of build-to-order computer systems.

This application relates to co-pending U.S. patent application Ser. No. 08/951,135, filed on Oct. 15, 1997, entitled "Modifiable Partition Boot Record for a Computer Memory Device", naming Alan Beelitz as inventor. The co-pending application is incorporated herein by reference in its entirety, and is assigned to the assignee of the present invention.

This application relates to co-pending U.S. patent application Ser. No. 08/984,386, filed on Dec. 3, 1997, entitled "System and Method for Changing Partition Mappings to Logical Drives in a Computer Memory", naming Alan Beelitz as inventor. The co-pending application is incorporated herein by reference in its entirety, and is assigned to the assignee of the present invention.

This application relates to co-pending U.S. patent application Ser. No. 08/950,545, filed on Oct. 15, 1997, entitled "System and Method for Updating Partition Mappings to Logical Drives in a Computer Memory Device", naming Alan Beelitz as inventor. The co-pending application is incorporated herein by reference in its entirety, and is assigned to the assignee of the present invention.

This application relates to co-pending U.S. patent application Ser. No. 08/947,138, filed on Oct. 8, 1997, entitled "Method for Simulating a Computer Storage Device", naming Alan Beelitz as inventor. The co-pending application is incorporated herein by reference in its entirety, and is assigned to the assignee of the present invention.

This application relates to co-pending U.S. patent application Ser. No. 08/951,137, filed on Oct. 15, 1997, entitled "System and Method for Utilizing a RAM Disk", naming Alan Beelitz as inventor. The co-pending application is incorporated herein by reference in its entirety, and is assigned to the assignee of the present invention.

This application relates to co-pending U.S. patent application Ser. No. 09/012,196, filed on Jan. 23, 1998, entitled "System and Method for Preparing a Computer Memory", naming Alan Beelitz as inventor. The co-pending application is incorporated herein by reference in its entirety, and is assigned to the assignee of the present invention.

This application relates to co-pending U.S. patent application Ser. No. 09/198,007, filed on Nov. 24, 1998, entitled "Computer System and Method for Accessing a Computer-Readable Medium", naming Alan Beelitz as inventor. The copending application is incorporated herein by reference in its entirety, and is assigned to the assignee of the present invention.

This application relates to co-pending U.S. patent application Ser. No. 09/198,731, filed on Nov. 24, 1998, entitled "Computer System and Method for Preparing a Computer-Readable Medium", naming Alan Beelitz as inventor. The copending application is incorporated herein by reference in its entirety, and is assigned to the assignee of the present invention.

A present trend among some computer manufacturers is to provide a customer with a custom built computer system in which the customer has designated that certain components and capabilities are to be included in the system being ordered. It is therefore important to maximize efficiency at every step of the build-to-order process. That efficiency begins at the time the order is placed and processed, and continues throughout the assembly, testing and shipment of the custom-built unit.

During production of build-to-order computer systems, specific components for a computer are pulled from stock and taken to an assembly pod where those specific components are assembled in the computer chassis. Following assembly, the chassis is moved to a quick-test area where tests are conducted to quickly determine whether the correct components for that order are installed, and whether the components are operative.

Following the quick test procedure, assembled chassis are moved to a burn rack where the components are "burned in" and where operational errors may be detected. Many units are simultaneously tested on the burn racks and the tests may take a number of hours to complete. With many units in production waiting to be tested, it is important that the burn rack spaces available for testing are used efficiently. Therefore, it is important that the computers or devices under test (DUT) are tested in a manner which quickly and efficiently determines whether a DUT is satisfactorily operational and if not, which quickly and efficiently determines operational deficiencies so that the DUT may be removed from the burn rack to free up the occupied burn rack space for another DUT to be tested.

A recent development has produced a computer which functions as a client on a network, rather than as a stand alone unit. This type of computer is distinguished from others by the lack of a diskette drive. The lack of a diskette drive results from a desire to centralize network management. The lack of a diskette drive on the computer however has significant implications in the manufacturing process, which has traditionally relied on the use of diskettes for implementation.

For example, operating system software is typically downloaded onto the hard drive of the computer system during the manufacturing process. Without a diskette drive, if an interruption occurs during the software download onto the hard drive of the computer system, then it is not possible to reboot the computer system from a manufacturing diskette and restart the download. Also, it is not possible to reboot the computer system from the network server because at this stage in the manufacturing process, the computer system is connected to a system software download server in the burn rack rather than to a system test server (LCM server) as in the quick test station, and the boot device of the computer system is set to "hard disk" rather than to "network". Booting from the hard disk would not work either, since the primary partition is marked active, i.e. bootable, and would result in attempting to load the partially downloaded target operating system. In this situation, the only recourse is to remove the computer from the burn rack and return it to the quick test area for reformatting and repartitioning so that it can be attached to the system test server (LCM server) and the entire manufacturing process can be restarted. This, however, is disadvantageously awkward and time consuming. Manufacturing efficiency and throughput would be adversely affected.

SUMMARY

A software installation process for use in the manufacture of a prescribed computer system includes the steps of providing at least one processor, at least one memory, and an interface for connecting the computer system to a network server. The at least one memory includes a master boot record, a utility partition and a primary partition. The utility partition includes manufacturing code particular to a manufacturing sequence in the manufacture of the computer system. Upon booting of the computer system, the manufacturing code is executed by the at least one processor, wherein the manufacturing sequence includes at least a downloading of software from the network server to the primary partition.

A technical advantage in the manufacture of a computer system, in particular a NetPC, according to the present disclosure is that the embodiments enable a recovery in the event of an interruption in the manufacturing process, the recovery being proximate to a given sequence or phase in the manufacturing process at which the interruption occurred, further not requiring the NetPC manufacturing process to begin anew with hard disk partitioning. A more efficient and effective NetPC manufacturing process is provided.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 1:
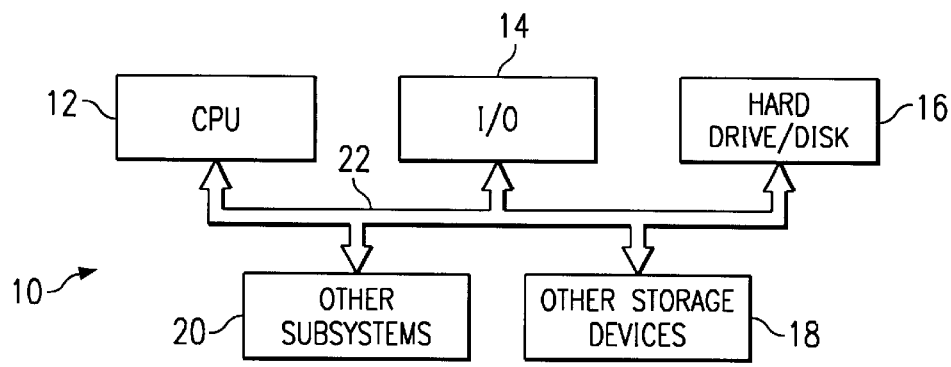
FIG. 1 illustrates a block diagram of a computer for implementing one embodiment of the present disclosure.

Referring briefly to FIG. 1, a system block diagram of a computer system 10 is shown having features thereof configured in accordance a customer configured computer system order as discussed herein. The computer system 10 includes a central processing unit (CPU) 12, input/output (I/O) devices, such as a display, a keyboard, a mouse, and associated controllers, collectively designated by a reference numeral 14, a hard disk drive 16, and other storage devices, such as a may include a floppy disk drive, CD-ROM drive, random access memory (RAM), non-volatile random access memory (NVRAM), read only memory (ROM) and other memory devices, collectively designated by a reference numeral 18, and various other subsystems, such as a network interface card (or NIC), modem, or watchdog timer, all collectively designated by a reference numeral 20, all interconnected via one or more buses, shown collectively in FIG. 1 as a bus 22. With respect to a NetPC, a floppy disk drive is typically not included. In the present example, the computer system 10 can include a personal computer running Microsoft DOS and/or WINDOWS. It is understood, however, that the computer system 10 and its illustrated components are merely representative of many different types of computers and components well known and understood by those of ordinary skill in the art.

Figure 2:
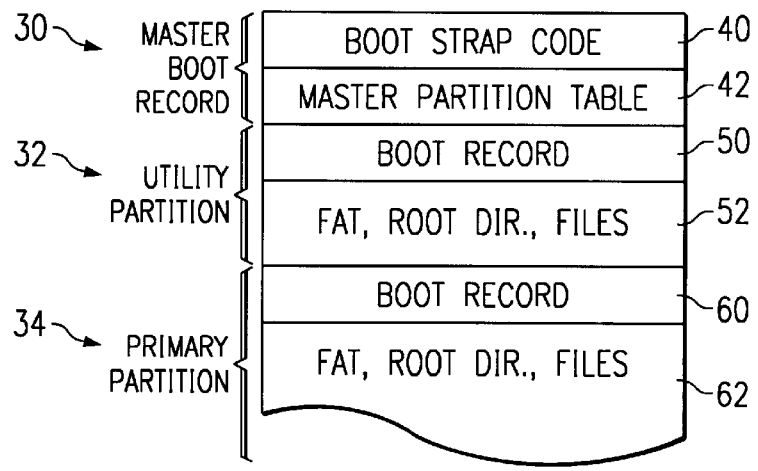
FIG. 2 is a layout diagram of a hard drive of the computer of FIG. 1.

Referring now to FIG. 2, the hard drive 16 is subdivided into at least three different partitions, including a master boot record 30, a utility partition 32 and a primary partition 34. Located in the master boot record 30 is boot strap code 40 and a master partition table 42. The master partition table 42 includes code that represents a type for each partition (32, 34). It is to be understood that the master boot record 30 also include conventional code, such as for booting up the computer system 10, which is well known in the art.

The utility partition includes a boot record 50 and file allocation tables, a root directory and files, collectively designated by reference numeral 52. Included with the files 52 is manufacturing code which specific to the computer system being manufactured. That is, the manufacturing code includes instructions for carrying out an extended testing and software installation in a prescribed manufacturing sequence, the software installation further being specific to the particular computer system being manufactured. In a normal operation of the computer system, the utility partition 32 will only be used during special circumstances, such as during maintenance and computer diagnostics operation. The primary partition 34 also contains a boot record 60 and file allocation tables, a root directory and files, collectively designated by reference numeral 62. In normal operation, the primary partition 34 will often be used and will consume the largest portion of the hard drive 16. Therefore, during normal operation, when an operating system access the hard drive 16, it will only see and access the primary partition 34 and not the utility partition 32.

Figure 3:
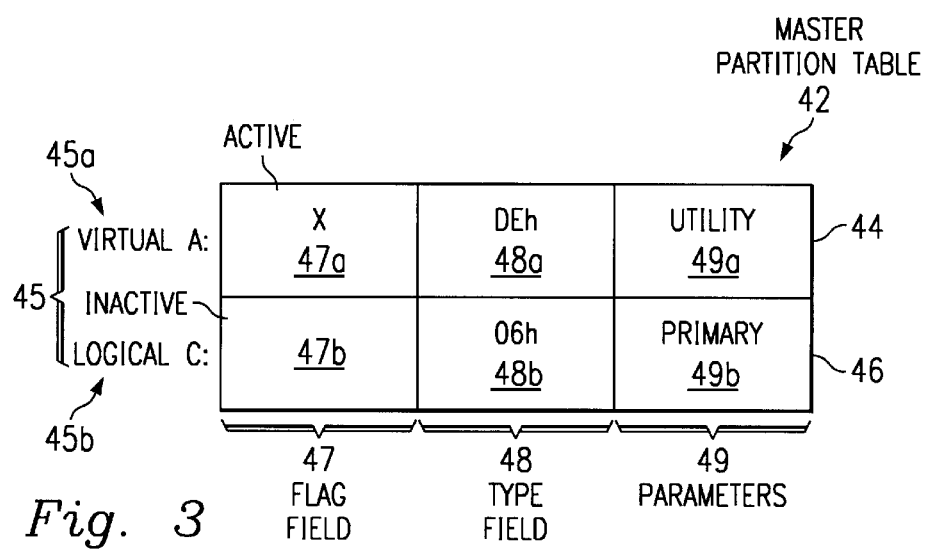
FIG. 3 illustrates an exemplary master partition table of the hard drive of the computer of FIG. 1.

Turning now to FIG. 3, an exemplary master partition table 42 is illustrated. In the master partition table 42, a first row or descriptor 44 relates to the utility partition and a second row or descriptor 46 relates to the primary partition. The columns reflect a flag field 47, a type field 48, and parameters 49, respectively. The flag field 47a for the utility partition has been marked active, whereas the flag field 47b for the primary partition has been marked inactive. The utility partition type field is DEh, an invalid type which is unrecognizable to DOS and thus making the utility partition invisible to DOS. The primary partition type field is 06h (or any other valid recognizable type, according to the intended file system to be resident on the primary partition). Parameters (49a, 49b) are also provided which relate and are specific to the utility partition and primary partition, respectively. Lastly, during the manufacturing of the computer system according to the present embodiments, prescribed mappings 45 are executed wherein the utility partition is to be mapped as a virtual A: drive, as indicated by reference numeral 45a, and the primary partition as the logical C: drive, as indicated by the reference numeral 45b, all as discussed further herein below.

Figure 4:
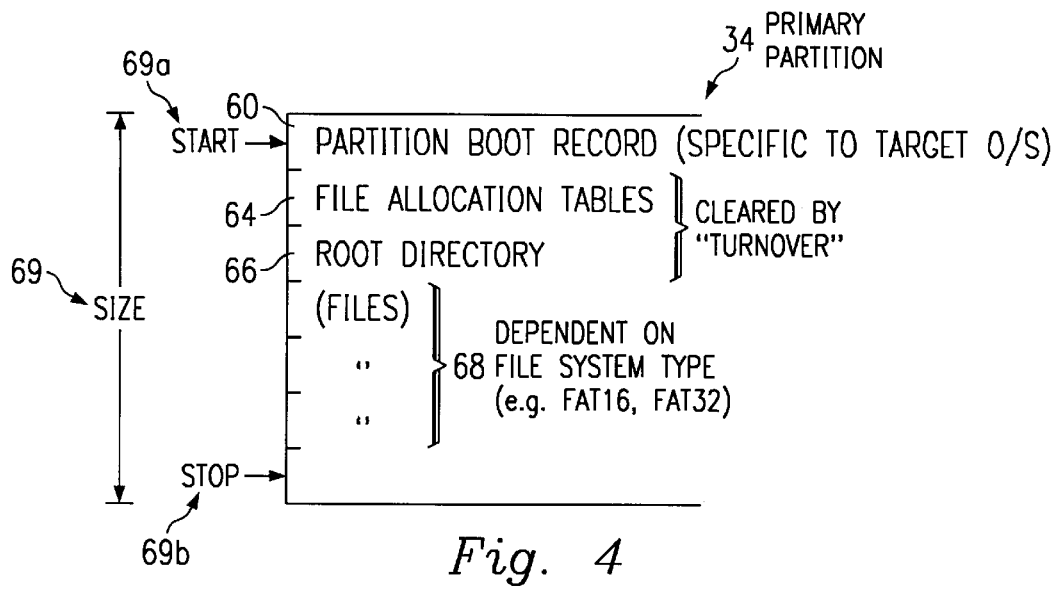
FIG. 4 illustrates an exemplary primary partition of the hard drive of the computer of FIG. 1.

With reference now to FIG. 4, the primary partition 34 (as shown in FIG. 2) is further illustrated in greater detail. Primary partition 34 includes a partition boot record 60, file allocation tables 64, root directory 66, and files 68. The partition boot record 60 is specific to the target operating system to be downloaded onto the primary partition. Files 68 depend upon the particular file system type (e.g., FAT16, FAT32, etc.) being used. The primary partition is further characterized by a prescribed size 69, having a start 69a and a stop 69b.

The method and apparatus of the present disclosure further includes the use of a Waffle program and a Turnover utility in the manufacture of a computer system, in particular a NetPC system. Currently the Waffle program is used as part of a built-toorder computer manufacturing process. The Waffle program is used for a number of memory drive manipulation functions. With respect to NetPC manufacturing, the Waffle program is enhanced to support a new directive. The new directive, referred to herein as "initial", instructs Waffle to set the master partition table 42 and certain drive mappings 45 to a specific state. In this "initial" state, the master partition table 42 is set such that the partition type 48*a* in the first descriptor 44 (which references the utility partition) is set to DEh (hex). In the second descriptor 46 (which references the primary partition), the partition type 48*b* is set to 06h, 0Bh, or 0Ch (depending upon the type of file system used in the primary partition). The first partition 32 is marked "active" (47*a*) (that is, the first partition will receive control when the system boots) and the second partition 34 is marked "inactive" (47*b*). Logical drive mappings 45 are then set such that the utility partition is mapped as a "virtual" A: drive (45*a*) and the primary partition is mapped as the logical C: drive (45*b*). Waffle handles the "initial" directive such that, as long as both a utility partition and a primary partition are present, the "initial" state can always be achieved. This is true regardless of the prior state of the master partition table or the drive mappings which might currently be in effect.

Once the computer system 10, and in particular, the hard disk 16 has been set to this "initial" state, the computer system manufacturing process can be carried out in a prescribed manner. Manufacturing process files are kept in the utility partition 32 (mapped as a "virtual" A: drive) and the software being downloaded is stored in the primary partition 34 (mapped as the logical C: drive). Under normal circumstances, no difference is apparent between the "initial" state and the "virtual A: drive" state, which makes NetPC manufacturing feasible. When an interruption occurs during the software download process, however, the "initial" state comes into play. Under normal circumstances, the primary partition 34 would be marked as "active" and will gain control if a reboot (either deliberate or inadvertent) occurs. Note that DOS always tries to map the active primary partition on the first disk as the logical C: drive, furthermore, in which an intervention after booting is needed to change this. With the disk set to the "initial" state, however, the utility partition has been marked "active" and therefore gains control when the system restarts. This allows the manufacturing process code (located in the utility partition) to regain control of the download process. Restoring the system to the "initial" state is one of the first steps in this process.

Because the software installation process is not designed to handle "partial" downloads (as results when the download process is interrupted), it is necessary to restore the primary partition 34 to a "pristine" state before attempting to restart the download. This is accomplished via the Turnover utility. The Turnover utility resets the file allocation tables 64 and root directory 66 of the primary partition 34 to an "empty" condition. It is not possible to perform this operation using a utility such as the DOS "format" command, because doing so would also replace the partition boot record 60. Note that the partition boot record 60 is associated with the target operating system and cannot be replaced without restarting the entire hard disk preparation process of Quick Test. After Turnover has completed its operations, the manufacturing process code (stored in the utility partition 32) can restart the software download into the empty primary partition 34. With a prescribed manufacturing process code for handling a recovery of a software installation process, recovery from an interrupted download can be fully automatic. In other words, recovery does not require the computer system 10 to be moved from its location in the burn rack and operator intervention is not needed.

In further discussion of Waffle, Waffle is a program which allows the logical C: drive designation to be swapped between the primary partition 34 and the utility partition 32. It accomplishes this by manipulating contents of a drive parameter block and drive data table in the internal operating system structures for the C: drive to reflect the parameters for either the primary partition 34 or the utility partition 32. The Waffle program also includes an ability to refresh the operating system's internal representation of a hard disk drive to match the actual parameters, intended for use after disk partitioning and formatting. The device associated with the logical A: drive can also be virtualized to the utility partition 32 via the Waffle program. Waffle is also compatible with disk caching and local-area networking. If the boot hard drive contains a FAT-formatted primary partition but the operating system does not contain the structures needed to access the drive, the Waffle program will synthesize these structures in, for example, a high memory area and make a logical C: drive accessible.

In one embodiment, the utility partition 32 is a type of FAT16 primary partition, typically quite small, for example, having a size on the order of about ten megabytes. The utility partition is further characterized by a partition type code of DEh (hex) which is not a generally recognized partition type. The utility partition further includes a special self-configuring partition boot record. The utility partition is created during the disk preparation process of QT, along with the "standard" partition types. On a hard disk which has been prepared with the utility partition, the first entry in the master partition table will describe the utility partition. The partition type code will be DEh and the partition will not be marked bootable. The next entry in the master partition table will describe the primary partition. If the primary partition is a FAT16 partition, the partition type code will be 06h. The primary partition entry will be marked bootable so that it receives control when the system starts up. This is the "ground" state of the master partition table. Many of the actions that can be performed by the Waffle program result in changes to this ground state.

In one embodiment, the Waffle program includes the ability to "synthesize" a logical drive. This capability is needed to handle the situation where a system has been booted with a hard drive that was not partitioned to include any logical drives but has subsequently had drives created. This situation arises in the manufacturing environment where a system is booted with a completely blank hard drive but then undergoes hard disk preparation, that is, partitioning and formatting.

Subsequent to hard disk preparation (partitioning and formatting), the hard disk contains logical drives which are not accessible (without first rebooting) because requisite structures have not been built. If the Waffle program detects this condition during its initialization phase, it will attempt to construct the structures in the High Memory Area (HMA) and link them with existing structures. The logical C: drive can then be accessed as usual but without the need for a reboot after disk preparation. This capability does not intrude on the DOS memory space, however it does require that HMA be available. The Waffle program further includes the ability to work with partitions that have been formatted using the FAT32 file system (such as used with Windows 95® and Windows NT®.

The Waffle initial function provides a prescribed action intended to set partition descriptors and logical drive mappings to a specific state for use during the manufacturing process, as discussed with reference to FIG. 3. As long as both a utility partition and a primary partition are present on the hard disk drive, using the waffle initial function ensures that the first partition descriptor of the master partition record references the utility partition and the second descriptor of the master partition record references the primary partition. The utility partition is marked active (so that it will gain control in the event of an unexpected reboot) and is mapped as a virtual A: drive. The primary partition maps to the logical C: drive with parameters matching the physical drive organization (equivalent to performing a "refresh" action).

The Waffle virtual program provides a prescribed action for mapping a virtual A: drive to the utility partition. In addition, the logical C: drive is mapped to the primary partition. Without both prescribed actions, a conflict would occur because both C: and A: would refer to the utility partition. The virtual A: drive can be used in the same manner as a physical drive; even diagnostic programs can be run successfully against the virtual drive. The capability for mapping the virtual A: drive to the utility partition and the logical C: drive to the primary partition is very useful in the manufacturing process.

Figure 5:
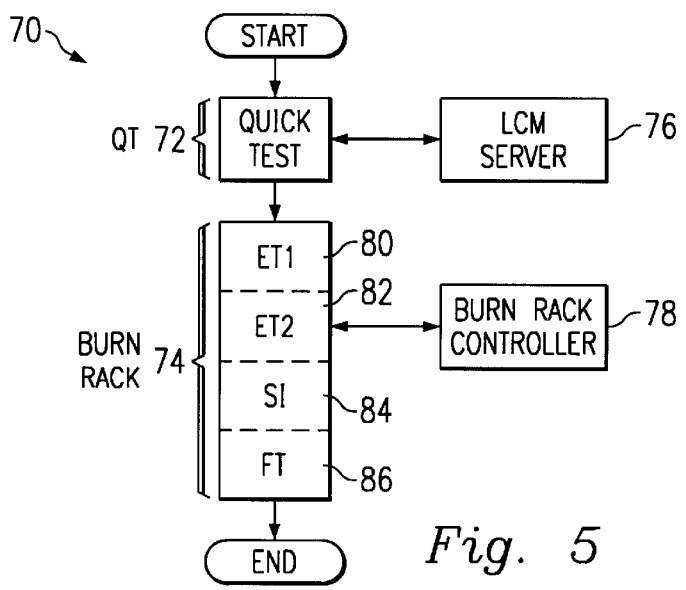
FIG. 5 illustrates a manufacturing process for the manufacture of the computer of FIG. 1 according to one embodiment of the present disclosure.
Figure 6:
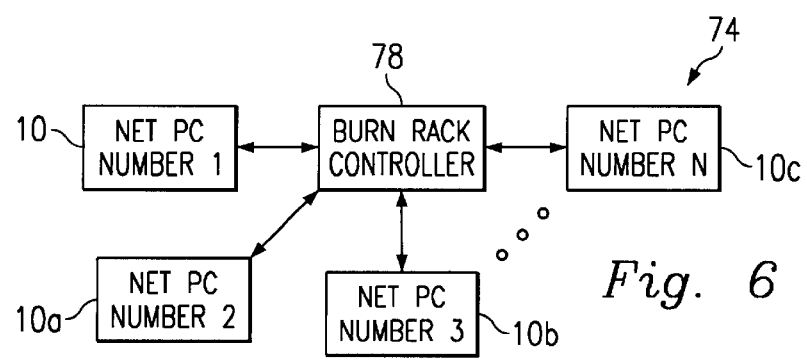
FIG. 6 illustrates coupling of computer systems to a burn rack controller during a burn rack processing according to one embodiment of the present disclosure.

With reference now to FIGS. 5 and 6, the computer system (including NetPC) manufacturing process includes two functional areas, indicated by reference numerals 72 and 74, respectively. A first functional area 72 comprises quick test (QT). During quick test, the computer system 10 (or NetPC) is connected to a specific type of server 76 referred to as the local area network (LAN) control manager server or LCM server such as is commercially available from Intel Corporation of Santa Clara, Calif. Upon completion of the quick test, the NetPC system 10 is then transferred to a burn rack 74. In the burn rack 74, the NetPC system 10 is connected to a burn rack controller or network server 78. While in the burn rack 74, the NetPC system 10 may undergo one or more of the following, including a first extended test (ET1) 80, a second extended test (ET2) 82, a software installation (SI) 84, and a final test (FT) 86. The recoverable aspect of the various embodiments of the present disclosure applies to the situation of the NetPC system while the NetPC system is on the burn rack 74. As shown in FIG. 6, any number of computer systems (10, 10a, 10b, 10c) can be connected up to the burn rack controller 78 at any given time during the manufacturing process, up to a maximum number N or limit of the burn rack controller.

During quick test 72, the NetPC system 10 boots to the LCM server 76. This is possible given that the NetPC system 10 includes a subsystem 20 such as a LAN adapter, network interface card (NIC), or other suitable device for connecting up to the network server. The LAN adapter is configured such that, during quick test, when the NetPC system is powered up (i.e., turned ON), the NetPC tries to boot up from the LCM server. In other words, the NetPC looks to the LCM server for the NetPC's boot up instructions. The LCM server performs a prescribed hard disk preparation on the computer system being manufactured (i.e., the client system) and also loads manufacturing information particular to the given computer system being built (i.e., per a customer configured computer system order). The manufacturing information or manufacturing code consists of a series of instructions (i.e., for implementing a prescribed manufacturing sequence) that will be executed for performing the testing phases and software downloading process while a given computer system is on the burn rack 74. The burn rack 74 thus provides for a prescribed testing and software installation for a given computer system according to, and as a function of, a particular customer order.

At this point in the manufacturing process (after QT 72 but before burn rack processing 74), the client system will have a hard disk which is partitioned and formatted. In a basic system, the hard disk is partitioned into first and second partitions. The first partition corresponds to a utility partition. The second partition corresponds to a primary partition. During manufacture of a NetPC, the manufacturing information (or instructions) are stored in a specific area of the hard disk, preferably, the utility partition. The primary partition is mapped to the logical C: drive and is to receive downloaded operating system software during software installation while on the burn rack 74, to be discussed herein further below. The utility partition may also include diagnostic related programs which may be accessed at some future time by a system user, as may be needed, for example, in running system related diagnostics. Upon a completion of the manufacture of a given NetPC, the manufacturing instructions may or may not persist in the utility partition according to a particular NetPC manufacturing process. In other words, the manufacturing instructions may be removed from the utility partition upon a completion of the manufacturing of the NetPC or they may remain in the utility portion according to the particulars of a prescribed NetPC manufacturing process.

As discussed, during QT 72, the computer system boots to the LCM server 76. The LCM server 76 readies the hard drive of the computer system in preparation for further manufacturing steps. QT 72 also includes some standard procedures applicable for all systems being built. Basic testing is carried out to test basic component operation, for instance, does the system power up when the power switch is turned to the ON position, etc. While discussed with respect to the use of an LCM server, note that it is not a requirement that the NetPC system boot from the LCM server during QT. It could also be possible to boot from abootable diskette attached to a normal server, wherein the NetPC is attached to the normal server. The remainder of the process as discussed herein would be otherwise unaffected.

As mentioned, to facilitate connection to a network, the NetPC includes a built in network adapter for establishing a suitable connection to a network. For instance, during manufacture of the NetPC, the network adapter component of the NetPC is utilized for connecting to prescribed network servers during a corresponding phase in the manufacturing of the NetPC systems. During QT, the network LCM server is coupled to a given NetPC via the network adapter and can advantageously look at a system tag (or serial number) of the given NetPC for identifying which manufacturing instructions to provide to the NetPC.

During the hard disk preparation process of QT, the assigning of "active" and "inactive" to respective partitions occurs. The utility partition is marked "active", which means that the utility partition gains control when the computer system boots up. The primary partition is marked "inactive" which means that the partition does not receive control automatically. The hard disk preparation process is furthermore carried out according to a Biscotti program executed by the LCM server. The NetPC boots based upon which partition of the hard drive is marked "active" at any given time.

Upon completion of the QT 72, the NetPC is moved to the burn rack 74. The burn rack 74 includes a number of docking stations or areas for receipt of computer systems being manufactured, one system per station (FIG. 6). In the case of positioning a NetPC system at a station on the burn rack, one or more cables are connected to the NetPC system as required for a given system. The cabling may include power, keyboard, display, etc. Upon a completion of the connection of needed cabling, the burn rack process then proceeds with extended testing and software installation. In a preferred embodiment, no additional intervention is needed wherein the burn rack 74 detects the presence of a computer system or NetPC and proceeds with testing and software installation according to the manufacturing information and instructions stored in the utility partition of the computer system's hard disk drive.

The burn rack 74 includes a burn rack controller or manufacturing server 78 for connection with the computer systems under test. The burn rack controller 78 would preferably include at least one connection via a local area network to the LAN adapter of each NetPC system. In an alternate embodiment, the NetPC may include an infrared (IR) port which may be used for connecting the NetPC system to the burn rack controller via a local area network, the burn rack also including a suitable IR port. Any number of NetPC systems may be connected up to the burn rack controller at any one time, up to a maximum input limit or number (N) of the burn rack controller. Each of the NetPC systems will generally be different, since each NetPC system to be manufactured is according to a customer's built-to-order custom configuration. The burn rack controller, in summary, facilitates execution the burn rack process by proceeding with an extended testing and software installation for each computer system connected thereto.

During the burn rack process 74, the locus of control is actually on the system 10 being built and not the burn rack controller 78. The system 10 being built communicates with the burn rack controller 78 to get code and data, according to the manufacturing information and instructions stored in the utility partition 32 of the hard disk drive 16. The system being built informs the burn rack controller which tests to perform and which software to install on the system's primary partition of the hard disk drive (i.e., what is to become the NetPC's logical C: drive).

Upon connection of a NetPC system to the burn rack controller and in view of the utility partition being marked "active", the utility partition gets control of the NetPC system at power ON, i.e. the beginning of the burn rack process. In other words, the NetPC tries to boot from the utility partition. Upon booting from the utility partition, the NetPC executes its manufacturing instructions which were loaded during the quick test. The NetPC knows what testing and software installation is needed to be done during the burn rack process for the completion of the manufacture of the particular built-to-order NetPC system.

The manufacturing process code of the utility partition of each NetPC system includes network/client software. The network/client software is also preferably loaded into the utility partition during the quick test process. As a result, each NetPC system includes the ability to attach to the burn rack controller via the LAN adapter of a respective NetPC. In addition to an initial boot, the network/client software enables the NetPC system to talk to the burn rack server throughout a remainder of the burn rack process, i.e., to obtain further detailed manufacturing data and instructions, etc.

During a normal burn rack process 74, a NetPC can be subjected to one or more of the following: a first extended test (ET1) 80, a second extended test (ET2) 82, software installation (SI) 84, and a final test (FT) 86. As mentioned, with a NetPC system, there is no diskette drive and thus no way to readily reboot a NetPC from its hard drive if the software installation therein is only partially complete, for example, as a result of an interruption during the burn rack process. Should a power failure or other interruption occur during any portion of the burn rack process, the present embodiments advantageously enable a recovery of the burn rack process for any NetPC system affected by such an interruption. The present embodiments further advantageously enable the avoidance of having to return to the quick test process for re-initializing or repartitioning the hard drive of a given NetPC.

Each NetPC may include instructions to try to boot from different sources according to a given boot order. A system could boot from diskette, from hard disk, or from a network. For the NetPC, however, in the absence of a diskette drive, the NetPC is instructed to try to boot from the network first, such as during the quick test process. Once the NetPC is booted from the server during quick test, the NetPC undergoes preparation and partitioning of the hard disk drive as discussed. The LCM server will know what specific NetPC system is being built at any one time by an identification through a service code and/or other suitable identification means of a respective NetPC system. The quick test, in essence, includes an initialization of the NetPC systems being manufactured.

As mentioned, the burn rack process includes extended testing and software installation for each NetPC system being manufactured. Extended testing one (ET1) 80 and extended testing two (ET2) 82 may include any number of functional tests for testing various devices of the NetPC being manufactured. For example, extended testing (ET1 and/or ET2) may include hard disk testing, memory testing, and/or device testing (testing of a modem, network interface card (NIC), sound card, or any other units requiring testing, etc.). The software installation (SI) portion 84 of the burn rack process 74 includes installation of software onto a given NetPC system 10, the software being downloaded from the manufacturing server 78 to the NetPC system 10 according to the manufacturing instructions contained in the utility partition of the respective NetPC system. In addition, software installation further may include the copying and editing of files from the manufacturing server.

The manufacturing server knows the identification of any given unit being built. The manufacturing server furthermore knows, based upon manufacturing information contained in the utility partition of a given NetPC system, which software is needed to be installed into the primary partition of the given NetPC system. In addition, the manufacturing information may also include instructions for the loading of software into the utility partition as well. In one embodiment, the utility partition can include an SDR file or system descriptor record file. The SDR file includes a list of part numbers particular to the given NetPC, the part numbers corresponding to particular software to be installed. In a preferred embodiment, the SDR file is part of the manufacturing information loaded into the utility partition of the hard disk drive of a respective NetPC system during the quick test process. In another embodiment, the system descriptor record file may be stored in a database for retrieval according to a NetPC identification code as needed by the manufacturing server for the software installation process steps of a given NetPC.

Furthermore, with respect to the SDR file, a list of part numbers may include part numbers corresponding to instructions for installing onto the primary partition, for example, operating system software, applications software, device drivers, etc. into the primary partition of a given NetPC system. Break-the-seal-code and/or customer diagnostics may be included in software to be installed on the utility partition of the hard disk drive. The manufacturing process code instructs the manufacturing server what software to install on the NetPC and where (e.g., the primary partition or the utility partition). The manufacturing process code is executed on the target system (i.e., the NetPC), the manufacturing process code further including the software which actually copies required files, data, and additional instructions from the server to the target system. The appropriate software files, data, and additional instructions are thus copied or transferred from the manufacturing server to the particular NetPC system in accordance with the manufacturing instructions of the respective NetPC system.

With respect to the burn rack, light emitting diodes, or other suitable indicators, may be used for visually indicating when a software installation process has been carried out successfully. Other possible forms of providing indication may likewise be implemented, including an electronic signal indication.

Upon completion of the software installation, the burn rack process continues with an optional final test (FT) 86. The final test is optional in that it may or may not be needed during the burn rack process for a given NetPC system. In the case of a final test 86, the NetPC can be powered OFF, powered ON, and rebooted in the target operating system. Any needed remaining tests are then conducted. For instance, if a CD-ROM is present in a given NetPC system, a sound test may be conducted.

In the event of a failure during the software installation portion of the burn rack process, the present embodiments enable for a recovery to be effected without the need to reformat and repartition the hard disk drive of a given NetPC, as will be discussed with reference to FIG. 7, for example. Recall that during quick test, the utility partition is identified as being "active" and the primary partition is identified as being "inactive", such that, upon a reboot, the utility partition has control. In either case, the active partition is the one which the system boots from on a reboot.

It is known in the art that a hard disk for personal computer systems (PCS) can hold up to four partitions, as indicated in what is referred to as a master partitions table. The master partitions table is included within a master boot record, the master boot record further including a bootstrap portion in addition to the master partition table. The master partition table includes several columns. One column includes a flag column. The flag column is used for indicating whether or not a partition is "active", i.e., bootable. A second column includes a type column. The type column is used for indicating the partition organization or file system. A third column (or additional columns) includes parameters particular to the respective partition. Parameters may include start, stop, and size, for example.

Bootstrap code looks through the partition table to make sure that one and only one of the partitions are marked "active". If no one partition is marked "active" or if there are more than one partitions marked "active", then the bootstrap code encounters an unrecoverable error. Let's assume that any one (and only one) of the partitions in the master partition table are marked "active". Each one of the partition entries has certain fields (flag, type, parameters) as indicated above with respect to the columns of the master partition table. Each partition entry indicates how the particular partition is organized. The bootstrap looks to the flag field to determine which of the partitions is marked "active". Upon determining the "active" partition, the bootstrap then goes to the "active" partition's parameters to determine where to start booting from.

In the master boot record of a NetPC according to the embodiments of the present disclosure, the utility partition of the master partition table is initially indicated as being "active" in the flag field. Similarly, the primary partition of the master partition table is initially indicated as being "inactive" in the flag field.

During the quick test process, booting of the NetPC system initially occurs from the LCM server. The quick test process includes the partitioning of the hard disk into the utility partition and the primary partition, in addition to setting the appropriate flags in the master partition table, i.e., making the utility partition "active" and the primary partition "inactive".

In the burn rack, when the NetPC is connected to the manufacturing server, booting of the NetPC results in booting from the utility partition, since the flag in the master partition table for the utility partition is marked "active". The bootstrap code then looks to the parameters of the utility partition to know where to start to boot from in the hard drive. As discussed, the utility partition includes the manufacturing process code particular to the given NetPC for ET1 80, ET2 82, SI 84, and FT 86 during the burn rack process of the respective NetPC.

Although the flag fields could possibly be used in conjunction with the recovery from an interruption during software installation, the present embodiments advantageously make use of a particular handling of the partition type field for effectuating a recovery upon an occurrence of an interruption of the software installation during burn rack processing. In other words, use of flag fields is preferably avoided. When a system gets to the customer, the utility partition is to be active. That is, a break-the-seal process code is generally included in the utility partition and is run when a customer powers up the NetPC system for the first time. Thus, the utility partition must be active upon an initial boot up by a customer for the break-the-seal code to execute and for the customer to break-the-seal and provide acceptance of respective licensing agreements associated with the software contained on the particular system. Upon an acceptance of the break-the-seal by the customer, the break-the-seal code marks the utility partition "inactive" and the primary partition "active". In that instance, subsequent program boot-ups would thus occur from the primary partition rather than the utility partition.

The various phases of the burn rack process each can alter the primary partition as the burn rack test progresses through ET1 80, ET2 82, SI 84, and FT 86. Thus, in the event of a failure occurring during the burn rack process, merely starting the burn rack process over again will not be sufficient. It is necessary to know at which phase of the burn rack process the NetPC is at, in order for the appropriate correction to be taken. For example, a partial software installation cannot be restarted, since some files will already be residing on the primary partition and the manufacturing instructions are not designed to cope with that type of partial software installation situation. To try to reload the system software into the primary partition containing a partial software installation will result in a manufacturing process system crash. Thus, the software installation must be restarted anew as will be discussed, however, according to the embodiments of the present disclosure, doing so without the requirement of preparation and repartitioning of the hard disk drive by re-executing the quick test process. The primary partition is affected during the burn rack process, thus the burn rack process for the NetPC system cannot merely be started over by disconnecting and reconnecting the NetPC to the manufacturing server and rebooting. The partially installed and altered primary partition will cause the burn rack process to crash.

Further with respect to the burn rack process, extended testing ET1 and ET2 can take hours to run. If a failure occurs during a software installation, it is highly desired that the affected NetPC(s) not be subjected to extended testing ET1 and ET2 a second time. The later would result in great inefficiencies in manufacturing throughput, wherein throughput is very important in the manufacturing process. Instead, it is desired that the burn rack testing pick up at the start of the phase in which an interruption occurred. That is, the present embodiments enable the burn rack process to start over with the failing phase or step. In other words, if the failure occurred during the software installation phase, then the burn rack process would be restarted at the software installation phase, having already progressed through previous phases of the burn rack process.

Upon a reboot, the master boot record of the hard disk drive is concerned with finding the partition having the active flag. The master boot record transfers control to the active partition, wherein the active partition takes control and runs its boot routine. The partition boot record of the active partition looks at the partition type field. In order to operate properly, the content of the partition type field must contain a code which is recognizable to the operating system, further corresponding to the operating system which is in the process of being loaded by the active partition. Additional discussion can be found in copending U.S. patent application Ser. No. 08/951,135, filed on Oct. 15, 1997, entitled "Modifiable Partition Boot Record For A Computer Memory Device" (Attorney Docket DC-1312), incorporated herein by reference in its entirety, and is assigned to the assignee of the present disclosure.

In the case of the utility partition, the utility partition includes a special boot record partition, further as discussed in DC-1312. At the output of the QT process, the master boot record will include a first partition boot record for the utility partition. The utility partition boot record will be marked "active" and contain a file type of DEh (hex). A second partition boot record is included for the primary partition boot record. The primary partition boot record is not "active" and has a file type, for example, of FAT (file allocation table) 16 or 32. Given the above, the utility partition boot record will gain control upon a reboot of the system subsequent to the QT process. The utility partition boot record acts to change the field type of the primary boot record to a type which the operating system to be loaded can understand (e.g., FAT). At this point in the manufacturing process subsequent to QT, the utility partition is mapped to the logical C: drive and the primary partition is mapped as an indeterminate drive (i.e., it could be the D: drive, E: drive, or other designation drive). This might appear to cause some trouble, in that, the entire computer manufacturing process is predicated upon the booting of a system from the A: drive.

With the NetPC manufacturing process according to the present disclosure, disk preparation of the hard disk drive 16 occurs preferably only once, without requiring repartitioning and re-formatting, as might occur in a typical computer system manufacturing process where the computer system includes a diskette drive. In the later instance, all of the manufacturing process code and state information is stored on a system diskette. Thus, during a manufacturing process, if an interruption were to occur, then the hard disk for such a computer system could be altered manually using information stored on the system diskette without adversely impacting the same to a great extent. Such a process however is a manual process and suffers limitations from usage of a diskette drive.

In the manufacture of a NetPC, there is no diskette for the storing of manufacturing process code and state information. The NetPC being manufactured is connected up to the manufacturing server for the NetPC to obtain the required software according to a given customer order. During manufacturing of a NetPC according to the present disclosure, the hard disk partitioning preferably occurs only once and thereafter is not modified. The resulting NetPC manufacturing process according to the present disclosure is thus extremely elegant and efficient. The recoverable aspect of the computer system manufacturing process, as discussed herein, makes the manufacturing process a great deal faster and more reliable than previous known processes.

As discussed, a result of the creation of the master boot record during QT is that the utility partition is marked "active" and includes a file type which is not recognizable by the operating system to be loaded onto the NetPC system. Upon booting of the NetPC system during burn rack process (according to DC-1312), the type DEh (hex) is changed to be made recognizable to the DOS that is in the utility partition. The system can then continue to boot up. Unfortunately, this is not a good situation, since DOS always maps the "active" partition to the C: drive. At this point, the utility partition has been mapped to the C: drive and the mapping of the primary partition is indeterminate. Without changing the process substantially, it is desired that the manufacturing process code and data be made to reside on the A: drive (i.e., the utility partition) and the download target reside on the C: drive (i.e., the primary partition). Using the waffle program as previously discussed herein above, the utility partition is remapped to the virtual A: drive and the primary partition is remapped to the C: drive, furthermore as more fully discussed in copending U.S. patent application Ser. No. 08/947,138, filed on Oct. 8, 1997, entitled "Method For Simulating A Computer Storage Device", DC-1315. At a prescribed point in the burn rack process, the waffle program is run and the manufacturing process code and data are reside on the virtual A: drive, corresponding to the utility partition of the hard drive. Furthermore, state information (i.e., sequence status) generated during the burn rack process can now be readily stored on the NetPC using the utility partition of the hard disk drive. One significant difference in the present embodiments over prior processes is that the virtual A: drive is now on the order of ten (10) Mbytes of hard disk storage space, which is much faster for accessing than with the use of diskette storage. The primary partition is substantially as originally set up during QT.

Recall that when the QT process is finished, the master boot record is established. In the master boot record, the utility partition is type DEh (hex) and marked active, while the primary partition can be any type (e.g., FAT 16) and marked inactive. Mappings per se are not of concern during the QT process. In addition, program code for performing the type conversion and program code for mapping the utility partition to the virtual A: drive and the primary partition to the C: drive (referred to as "waffle virtualization", a component of the Waffle program) are each loaded onto the utility partition during QT processing. At the finish of the QT process, the NetPC system is taken from the QT station to the burn rack. Upon making the needed connections to the manufacturing server, the NetPC is turned ON. At power up, the master boot record gets executed and recognizes that it contains an active boot record. Program code in the active boot record (i.e., the utility partition boot record) is then executed for converting itself into something which DOS can recognize, by changing the type field of the utility partition in the master partition table (waffle "initial" according to DC-1312). At this point, DOS is up and running, the utility partition is the C: drive, and the primary partition is an indeterminate drive. Then, program code is executed (waffle "virtual" according to DC-1315) for mapping the utility partition to the virtual A: drive and the primary partition to the logical C: drive.

In a typical computer user situation, the utility partition is not normally accessible to a customer without first carrying out some special BIOS keystrokes, for example. The utility partition was given the type DEh (hex) since it is an invalid type and not recognizable to operating systems. The utility partition is thus not typically accessed during normal computer usage. A break-the-seal program code may be stored in the utility partition, however, in which after an initial execution, the break-the-seal program becomes inaccessible to the system user by changing the partition type of the utility partition to an invalid or unrecognizable type.

In accordance with the present disclosure, during burn rack processing, the Waffle initial program causes the type field for the utility partition to be changed from an unrecognizable or invalid type to a recognizable or valid type for a prescribed duration as required. The valid partition type is one which is recognizable by the operating system being loaded. In other words, the type field is changed from the invalid type DEh (hex) to a recognizable or valid type (e.g., FAT) to enable the utility partition to be used for carrying out the various manufacturing instructions, code, storing of data, etc. as needed during burn rack processing for the manufacture of a NetPC. Upon a completion of the usage of the utility partition in the burn rack processing, the type field of the utility partition is changed back to an unrecognizable or invalid type (e.g., DEh (hex)).

Upon a virtualization of the utility partition to the A: drive and the primary partition to the C: drive near the start of burn rack processing, the NetPC system is then ready for proceeding with extended testing and software installation of the remainder of burn rack processing. Assuming no problems occur, the burn rack processing would then proceed through ET1 80, ET2 82, SI 84, and FT 86 according to the requirements of a prescribed NetPC system being manufactured. During SI 84, the burn rack processing loads the prescribed operating system code and other software according to the custom configured order from the manufacturing server onto the primary partition.

The present embodiments advantageously address a situation in which something goes wrong during the burn rack processing. For instance, a power interruption could occur during a software download or software installation. Normally, the C: drive would map to the active primary partition. However, mapping of the C: drive to the active partition at this point in the manufacturing process is not desired, since in the event of an interruption, a rebooting of the NetPC system would then try to reboot from a partial software installation. A disabled system would result. In the event of an interruption, the present embodiments enable the NetPC system to return to the utility partition code for the recovering of a system error during the burn rack processing. In essence, the NetPC system is temporarily configured to carry out a procedure which seems completely unnatural or unconventional, as further discussed herein.

A state is defined, referred to herein as a waffle "initial" state, which corresponds to a particular modified master partition table and set of drive mappings. In other words, with respect to the modified master partition table, even though the logical C: drive is mapped to the primary partition and the virtual A: drive is mapped to the utility partition, the utility partition is marked "active". The waffle initial state can thus be defined as the logical C: drive being mapped to the primary partition, the virtual A: drive being mapped to the utility partition, and further wherein the utility partition is designated active. Program code is provided in the utility partition, referred to herein as a waffle initial program, for modifying the master partition table and placing it in the prescribed waffle initial state as noted above. Upon reboot, the system will always boot to the virtual A: drive, since execution of the waffle initial program returns the master partition table to the waffle initial state. In other words, the master partition table can always be returned to the waffle initial state during the burn rack processing in the event of an interruption of the burn rack processing. Recall that the partition type is referenced only when the operating system is first booting up. Upon reboot, the NetPC system boots to the DOS contained in the utility partition. The waffle initial program is run after the operating system is initially booted up, thus the utility partition type is not significant with respect to execution of DOS operating system commands during the burn rack processing execution of manufacturing process code subsequent to the NetPC being booted up. The ability to achieve the waffle initial state forms only part of the recovery.

Program code is also provided in the utility partition, referred to herein as a waffle "virtual" program. With waffle "virtual", the utility partition is designated the virtual A: drive and marked inactive and the primary partition is designated the C: drive and marked active. With waffle "initial", the A: drive is marked as an active partition of the hard disk drive and the C: drive is marked inactive. With all known operating systems, the C: drive always maps to the first active primary hard disk partition.

Upon power up, the NetPC system is booting into the DOS which is part of the utility partition. The DOS contained in the utility partition runs the manufacturing process code. The NetPC system thus looks to the utility partition during system bootup. The utility partition type must be recognizable by the operating system (yet to be loaded) when the system is first booted up. The partition is first made to be recognizable by the operating system, according to the method of DC-1312, i.e., as the C: drive and continue loading the DOS, since DOS does not map things in a way for the manufacturing process to continue. Waffle initial is then executed, wherein desired configurations are established. For waffle initial, there is no conventional way to get an operating system to normally do this, that is, to designate the utility partition as the A: drive, furthermore as a hard disk partition and active partition. With all known PC operating systems, C: drive always maps to the first primary active hard disk partition. In other words, the utility partition is mapped as the A: drive and the A: drive is marked as an active hard disk partition, thus enabling booting from the A: drive and not the C: drive. The utility partition, however, is not the A: drive until after waffle initial has been run or carried out. Standard DOS and other Microsoft® operating systems all map the C: drive to the first active primary partition of the hard disk in contrast to the embodiments of the present disclosure.

With the waffle "initial" capability, the drive mappings are guaranteed to be in accordance with a desired mapping, that is, the manufacturing process code is in the A: drive (the utility partition); and the target drive is the C: drive (the primary partition). Upon the occurrence an unexpected reboot, power failure, or other interruption during the burn rack process, the utility partition process code will always regain control. The process code can determine where it was in the burn rack process and attempt to restart the process from just prior to where the interruption occurred. The manufacturing process code regains control because it is resident in the active partition (i.e., the utility partition). When the system boots up, the master boot record bootstrap code is going to look for the first active hard disk partition. The bootstrap code looks to the master partition table, where it sees that the utility partition is the first active hard drive partition (at this point in time, the mappings of A: drive to the utility partition and C: drive to the primary partition have not yet taken place).

A typical sequence for the burn rack process is as follows. When the NetPC is turned ON, the system boots up. Upon system boot, the master boot record (MBR) is loaded from the hard disk drive. Recall that the MBR includes two sections, a bootstrap in the first section and a master partition table in the second section. The bootstrap searches the master partition table for the active partition and proceeds to load and run the active partition (in this instance, the utility partition). The partition boot record then loads the operating system residing in the partition (in this instance, the utility partition) and (according to DC-1312) changes the partition type (i.e., from DEh) to one which is recognizable by the operating system (residing in the utility partition) being loaded to enable the operating system to recognize the partition type. The operating system, as it comes up, determines what hard drives are on the NetPC system and makes an assignment of logical drives (at this point in time, the C: drive corresponding to the utility partition and an indeterminate drive corresponding to the primary partition). The waffle initial facility/program is run to change drive assignments (the utility partition is mapped to the virtual A: drive and the primary partition is mapped to the logical C: drive). In addition, the utility partition is marked active and the primary partition is marked inactive (waffle initial). The waffle program can also change the partition type of the utility partition back to a non-recognizable type, such as DEh. The significance of having the utility partition changed back to be a non-recognizable type is irrelevant with respect to the remainder of the manufacturing process discussed herein, however, it is made non-recognizable mainly to prevent any accidental changing of the utility partition at a later time by a system user. Once the drives are reassigned as a result of waffle initial, the utility partition is now the A: drive and marked active. In addition, there is no need to be concerned about the operating system rebooting and not recognizing the partition type of the utility partition, since the partition type is handled as discussed herein above with reference to waffle initial (DC-1312). In addition, once the operating system is running, then the partition type of the active partition is no longer needed to be recognized by the operating system. A "turnover" utility or program, to be discussed further herein, is also provided and may be run to clear out the contents of the primary partition (i.e., C: drive) as needed, further according to a particular burn rack processing implementation.

Recalling now for a moment hard drive partitions, a partition has certain parameter fields including start, stop, and size. Subsequent to the disk preparation and partitioning steps in QT, the partition boot record for the primary partition is made to be specific to the target operating system (e.g., Windows 95®, Windows 98®, Windows NT®, etc.) being loaded onto the customer's primary partition of the NetPC system, according to the specific customer order. For a FAT type file system, the partition may also include file allocation tables, a root directory, and files.

At the beginning of the burn rack processing, the primary partition contains a partition boot record. Once the partition boot record for the primary partition has been established duringthe QT process, then according to the present embodiments, upon the occurrence of an interruption during burn rack processing, a recoverable process can be is carried out which includes leaving the partition boot record of the primary partition unchanged, while resetting the file allocation tables and root directory (i.e., the file system structures). Files of the primary partition may also be cleared.

In accordance with the embodiments of the present disclosure, a "turnover" program or utility is included within the manufacturing process code, the turnover utility including suitable code for specifically locating and clearing out the file allocation tables and the root directory of the primary partition, without affecting the primary partition boot record. In other words, upon execution of the turnover program, the primary partition boot record remains unchanged while the remainder of the primary partition is rendered blank or cleared out. The turnover program effectively clears the contents of the logical C: drive, with the exception of the primary partition boot record which is specific to the target operating system, thereby and substantially eliminates any need to return to the QT process for repartitioning of the hard drive.

The contents of the primary partition boot record need not be known during QT process, since the contents are only being loaded onto the hard disk during the hard disk preparation of the QT process. However, during burn rack processing, the contents of the primary partition boot record are important. The contents of the primary partition boot record are left alone and unchanged by the turnover program during a recovery of burn rack processing in the event of an interruption.

Parameters of the primary partition also include a partition boot record of a given length, file allocation tables of a given length, a root directory of a given length, and files of the partition. Note that the dimension and structure of the file allocation tables, root directory, and files of the partition are dependent on the particular file system type (e.g., FAT16, FAT32, etc.). As mentioned, with the turnover program, the file allocation tables and root directory are specifically searched out and cleared. The turnover program identifies a particular type of file system of the file allocation tables and root directory and furthermore clears the same according to the particular file system type. The turnover utility can thus be considered a smart utility. The files of the primary partition may also be searched out and cleared, if desired for a particular implementation, however, it is not absolutely necessary. The primary partition boot record, which was established during the QT process and further which is specific to the particular target operating system, is left unchanged subsequent to execution of the turnover utility. Accordingly, the integrity of the primary partition boot record of the primary partition is advantageously maintained. Burn rack processing can then be restarted at the particular phase thereof in which the interruption occurred. For example, each test or software download can be restarted after running the turnover utility. In that way, the test or software download can start out knowing that the primary partition has been cleared (e.g., having a blank slate or an empty C: drive partition) with the exception of the primary partition boot record.

The turnover facility may also be run as needed to clear out the contents of the primary partition (i.e., C: drive) according to a particular burn rack processing implementation. Depending upon the manufacturing process code, it may be desirable to keep track of the when each portion of the burn rack processing has begun and ended (i.e., start and stop). The status of a given processing step may be stored temporarily. If a problem or interruption is detected during burn rack processing, for instance, a suitable flag may be triggered. Upon a detection of a triggered flag, the turnover program may be run prior to a restart of the particular portion of the burn rack processing which gave rise to the problem or interruption. The turnover program can be executed or run as many times as necessary for a particular burn rack processing of a given NetPC, up to a maximum desired prescribed number of times or for a time duration of up to a given maximum time limitation. A maximum time limitation can be established for preventing any NetPC from residing on the burn rack for an indeterminate duration, for example, with the use of a watch dog timer.

Various methods may be used for determining when an interruption in the burn rack processing occurs. Consider, for example, the following. During execution of the various portions of the burn rack processing, (ET1, ET2, SI, and FT), there will be a number of boots throughout the burn rack process. There will be initial boots into ET1 and ET2. In one embodiment, sequencing code can be used for determining where the control goes within the manufacturing process code, wherein the sequencing code can be written using programming techniques known in the art. Reboots which are implemented can be recorded or stored, for example, with the issuance of a respective reboot flag which can be stored in a reboot flag file within the manufacturing process code. If a reboot flag appears out of sequence, then the same may provide an indication that an interruption in the burn rack processing has occurred, and corrective action may be taken accordingly. Corrective action includes the clearing of the primary partition as discussed herein with the use of the turnover program or utility. Conversely, process monitoring code can be included within the manufacturing process code and used to monitor or look for a start/stop of ET1, ET2, SI, and FT. If either of the start or stop are not detected, then indication of an interruption or problem in the burn rack processing can be provided and an appropriate corrective action initiated.

Figure 7:
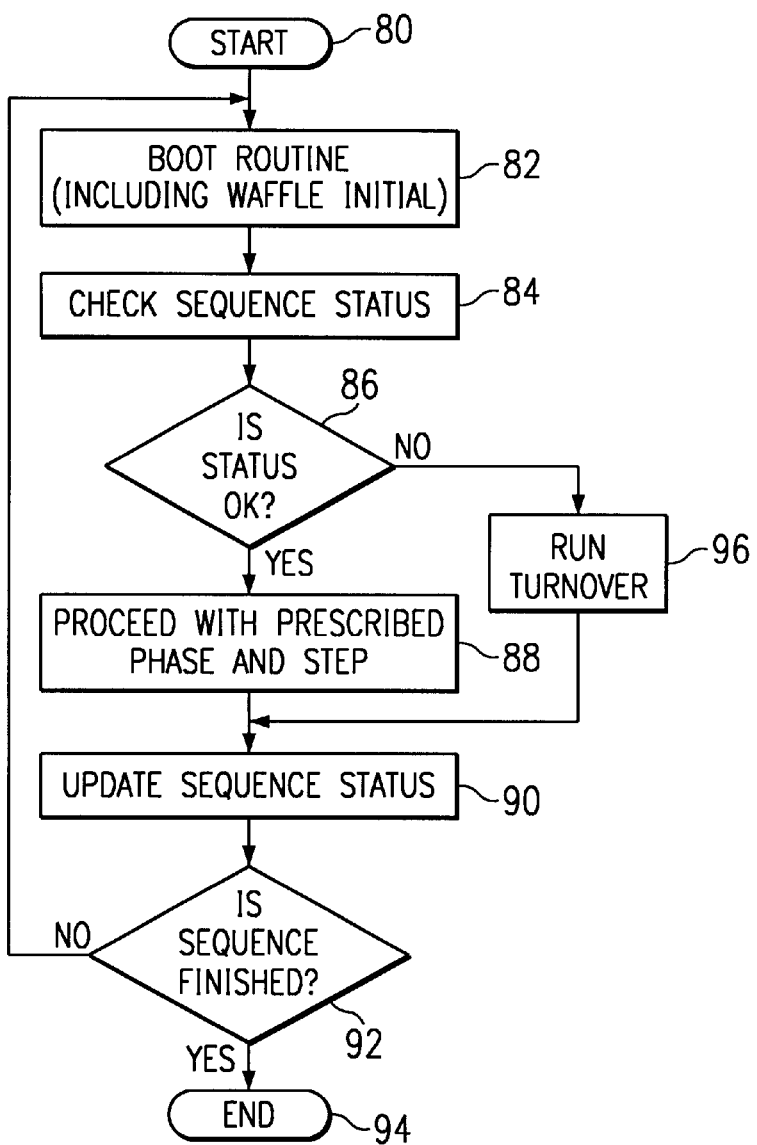
FIG. 7 is a flow diagram of the burn rack processing, including extended testing and software installation processes according to a prescribed manufacturing sequence, in the manufacturing of a computer according to the present disclosure.

Turning now to FIG. 7, a flow diagram of the burn rack processing in the manufacturing of a computer according to the present disclosure is shown. Burn rack processing may include extended testing and software installation according to a prescribed manufacturing sequence beginning at step 80. The extended testing and software installation sequence may include ET1, ET2, SI, and FT. In step 82, the computer system is booted up. As discussed, the utility partition is marked active, and thus the master boot record looks to the first active partition for booting. Step 82 further includes execution of the Waffle initial program and mapping of the utility partition to the virtual A: drive and the primary partition to the logical C: drive. In step 84, a burn rack sequence status is checked to determine which step of the extended testing and software installation the manufacturing code is currently set to execute. The burn rack sequence status may be stored, for example, in the utility partition of the hard disk drive. In step 86, the status of the current step is checked to determine if the step is ready to be executed (i.e., start) or whether the step has been previously executed but interrupted (i.e., failure). If the status is okay, then the process continues with step 88. In step 88, the particular extended test or software installation is carried out. In step 90, the sequence status is updated. Updating of the sequence status may include, for example, advancing of the sequence status to the next step in the sequence of extended testing and software installation to be carried out provided that the current extended test or software installation just carried out was completed successfully. Updating of the sequence status may also include providing an indication that the given extended test or software installation was interrupted or failed and then keeping the sequence status at the same step for being carried out again. In step 92, an inquiry is made as to whether or not all testing or software installation has been successfully completed, i.e., whether or not the prescribed sequence is finished. If not finished, the process continues with the boot routine in step 82. If finished, the process ends at step 94.

If at step 86, the status of the current sequence step is not ok, then the process proceeds to step 96. Step 96 includes running of the Turnover utility for clearing out the file allocation tables, root directory, and files of the primary partition and thus enabling the sequence step which failed or which was interrupted to be carried out again. Subsequent to step 96, the process continues to step 90, wherein the sequence status is updated. Execution of the Turnover utility influences the updating of the sequence status to reset the sequence status to the current step of extended testing and software installation to enable the particular sequence step to be carried out again. The process then continues with step 92, as discussed.

The present embodiments thus advantageously enables the manufacturing of a network computer system, in particular, those not having a diskette drive, to be manufactured and for corrective action to be taken without the requirement of having to start the computer system manufacturing process all the way from the beginning again, for example, with quick test (QT). Rather, the present embodiments enable the computer system manufacturing process to restart again at the particular portion of the burn rack processing in which a problem or interruption occurred.

With the present recoverable process, it is guaranteed that, even though there is an unnatural or unconventional hard disk drive mapping, the utility partition will gain control such that the manufacturing process code is always accessible. The primary partition can be reset to an empty state (via the turnover utility), without impacting the partition boot record of the primary partition. In addition, no manual intervention is required for example, in the event of a power interruption. Upon the detection of an interruption in the burn rack processing, an appropriate corrective action can be taken without requiring manual intervention. Corrective action can be programmed or coded according to a particular corrective action sequence for a given manufacturing process implementation, the corrective action being coded using programming techniques known in the art.

The present embodiments provide a technical advantage in the manufacture of a NetPC which enables a recoverable process in the event of an interruption in the manufacturing process, wherein a recovery is proximate to the given sequence or phase in the manufacturing process at which the interruption occurred, thus not requiring the NetPC manufacturing process to begin again with hard disk partitioning. A more efficient and effective NetPC manufacturing process results.

While the method and apparatus of the present disclosure have been particularly shown and described with reference to the preferred embodiments thereof, it will be understood by those skilled in the art that various changes in form and detail may be made therein without departing form the spirit and scope of the present embodiments, as set forth in the following claims.

What is claimed is:

1. A software installation process for use in the manufacture of a prescribed computer system, said method comprising the steps of:

providing at least one processor, providing at least one memory, the at least one memory having a master boot record, a utility partition and a primary partition, wherein the utility partition includes manufacturing code particular to a manufacturing sequence in the manufacture of the computer system; and providing an interface for connecting the computer system to a network server, wherein upon booting of the computer system, the manufacturing code is executed by the at least one processor, the manufacturing sequence including at least a downloading of software from the network server to the primary partition.

2. The method of claim 1, wherein the master boot record includes a master partition table having a first descriptor corresponding to the utility partition and a second descriptor corresponding to the primary partition, wherein the first descriptor includes an active partition flag field and an invalid partition type field and the second descriptor includes an inactive partition flag field and a valid partition type field, and the primary partition includes a partition boot record particular to a target operating system of the computer system.

3. The method of claim 2, wherein the manufacturing code further includes instructions for changing the invalid partition type field of the first descriptor into a valid type field and for mapping the utility partition to a virtual A: drive and the primary partition to a logical C: drive.

4. The method of claim 3, wherein the manufacturing code further includes instructions for changing the valid partition type field of the first descriptor back into an invalid type field subsequent to mapping the utility partition to the virtual A: drive and the primary partition to the logical C: drive.

5. The method of claim 2, wherein the primary partition further includes file allocation tables and a root directory, and wherein the manufacturing code further includes instructions for clearing the file allocation tables and the root directory of the primary partition upon the occurrence of an interruption in the downloading of software from the network server and instructions for enabling the software download to be restarted without reformatting and repartitioning of the at least one memory.

6. The method of claim 5, wherein the primary partition further includes files, and wherein the manufacturing code further includes instructions for clearing the files of the primary partition upon the occurrence of an interruption in the downloading of software from the network server.

7. The method of claim 1, wherein the manufacturing sequence further includes testing.

8. The method of claim 7, wherein the manufacturing code further includes instructions for storing a manufacturing sequence status in the utility partition and instructions for updating the manufacturing sequence status as each of the software download and testing are completed.

9. The method of claim 1, wherein the at least one memory includes a disk drive.

10. The method of claim 1, wherein the at least one memory includes a hard disk drive.

11. A software installation process for use in the manufacture of a prescribed computer system, said method comprising the steps of:

providing at least one processor, providing at least one memory, the at least one memory having a master boot record, a utility partition and a primary partition, wherein the utility partition includes manufacturing code particular to a manufacturing sequence in the manufacture of the computer system; and providing an interface for connecting the computer system to a network server, wherein upon booting of the computer system, the manufacturing code is executed by the at least one processor, the manufacturing sequence including at least a downloading of software from the network server to the primary partition, wherein the master boot record includes a master partition table having a first descriptor corresponding to the utility partition and a second descriptor corresponding to the primary partition, wherein the first descriptor includes an active partition flag field and an invalid partition type field and the second descriptor includes an inactive partition flag field and a valid partition type field, and the primary partition includes a partition boot record particular to a target operating system of the computer system, wherein the manufacturing code further includes instructions for changing the invalid partition type field of the first descriptor into a valid type field and for mapping the utility partition to a virtual A: drive and the primary partition to a logical C: drive, and wherein the primary partition further includes file allocation tables and a root directory, and wherein the manufacturing code further includes instructions for clearing the file allocation tables and the root directory of the primary partition upon the occurrence of an interruption in the downloading of software from the network server and instructions for enabling the software download to be restarted without reformatting and repartitioning of the at least one memory.

12. The method of claim 11, wherein the primary partition further includes files, and wherein the manufacturing code further includes instructions for clearing the files of the primary partition upon the occurrence of an interruption in the downloading of software from the network server.

13. The method of claim 11, wherein the manufacturing sequence further includes testing.

14. The method of claim 13, wherein the manufacturing code further includes instructions for storing a manufacturing sequence status in the utility partition and instructions for updating the manufacturing sequence status as each of the software download and testing are completed.

15. The method of claim 11, wherein the at least one memory includes a hard disk drive.

16. A computer system for carrying out a software installation in the manufacture thereof, said computer system comprising:

at least one processor, at least one memory, said at least one memory having a master boot record, a utility partition and a primary partition, wherein the utility partition includes manufacturing code particular to a manufacturing sequence in the manufacture of said computer system; and an interface for connecting said computer system to a network server, wherein upon booting of said computer system, the manufacturing code is executed by said at least one processor, the manufacturing sequence including at least a downloading of software from the network server to the primary partition.

17. The computer system of claim 16, wherein the master boot record includes a master partition table having a first descriptor corresponding to the utility partition and a second descriptor corresponding to the primary partition, wherein the first descriptor includes an active partition flag field and an invalid partition type field and the second descriptor includes an inactive partition flag field and a valid partition type field, and the primary partition includes a partition boot record particular to a target operating system of said computer system.

18. The computer system of claim 17, wherein the manufacturing code further includes instructions for changing the invalid partition type field of the first descriptor into a valid type field and for mapping the utility partition to a virtual A: drive and the primary partition to a logical C: drive.

19. The computer system of claim 18, wherein the manufacturing code further includes instructions for changing the valid partition type field of the first descriptor back into an invalid type field subsequent to mapping the utility partition to the virtual A: drive and the primary partition to the logical C: drive.

20. The computer system of claim 17, wherein the primary partition further includes file allocation tables and a root directory, and wherein the manufacturing code further includes instructions for clearing the file allocation tables and the root directory of the primary partition upon the occurrence of an interruption in the downloading of software from the network server and instructions for enabling the software download to be restarted without reformatting and repartitioning of said at least one memory.

21. The computer system of claim 20, wherein the primary partition further includes files, and wherein the manufacturing code further includes instructions for clearing the files of the primary partition upon the occurrence of an interruption in the downloading of software from the network server.

22. The computer system of claim 16, wherein the manufacturing sequence further includes testing.

23. The computer system of claim 22, wherein the manufacturing code further includes instructions for storing a manufacturing sequence status in the utility partition and instructions for updating the manufacturing sequence status as each of the software download and testing are completed.

24. The computer system of claim 16, wherein said at least one memory includes a disk drive.

25. The computer system of claim 16, wherein said at least one memory includes a hard disk drive.

26. A computer system for carrying out a software installation in the manufacture thereof, said computer system comprising:

at least one processor, at least one memory, said at least one memory having a master boot record, a utility partition and a primary partition, wherein the utility partition includes manufacturing code particular to a manufacturing sequence in the manufacture of the computer system; and an interface for connecting said computer system to a network server, wherein upon booting of said computer system, the manufacturing code is executed by said at least one processor, the manufacturing sequence including at least a downloading of software from the network server to the primary partition, wherein the master boot record includes a master partition table having a first descriptor corresponding to the utility partition and a second descriptor corresponding to the primary partition, wherein the first descriptor includes an active partition flag field and an invalid partition type field and the second descriptor includes an inactive partition flag field and a valid partition type field, and the primary partition includes a partition boot record particular to a target operating system of the computer system, wherein the manufacturing code further includes instructions for changing the invalid partition type field of the first descriptor into a valid type field and for mapping the utility partition to a virtual A: drive and the primary partition to a logical C: drive, and wherein the primary partition further includes file allocation tables and a root directory, and wherein the manufacturing code further includes instructions for clearing the file allocation tables and the root directory of the primary partition upon the occurrence of an interruption in the downloading of software from the network server and instructions for enabling the software download to be restarted without reformatting and repartitioning of said at least one memory.

27. The computer system of claim 26, wherein the primary partition further includes files, and wherein the manufacturing code further includes instructions for clearing the files of the primary partition upon the occurrence of an interruption in the downloading of software from the network server.

28. The computer system of claim 26, wherein the manufacturing sequence further includes testing.

29. The computer system of claim 28, wherein the manufacturing code further includes instructions for storing a manufacturing sequence status in the utility partition and instructions for updating the manufacturing sequence status as each of the software download and testing are completed.

30. The computer system of claim 26, wherein said at least one memory includes a hard disk drive.

* * * * *